(12) United States Patent
Benjamin et al.

(10) Patent No.: US 7,072,966 B1
(45) Date of Patent: Jul. 4, 2006

(54) SKILLS-BASED ROUTING OF A COMMUNICATION SESSION

(75) Inventors: Gerald D. Benjamin, Jupiter, FL (US); William O. Whisenhunt, Coppell, TX (US); Blair E. Nygren, Coppell, TX (US)

(73) Assignee: eTalk Corporation, Irving, TX (US)

( * ) Notice: Subject to any disclaimer, the term of this patent is extended or adjusted under 35 U.S.C. 154(b) by 773 days.

(21) Appl. No.: 09/930,616

(22) Filed: Aug. 14, 2001

(51) Int. Cl.
*G06F 15/16* (2006.01)
*H04M 3/00* (2006.01)

(52) U.S. Cl. .............................. 709/228; 379/265.12
(58) Field of Classification Search ........ 709/226–229, 709/240; 379/265.02, 265.03, 265.05, 265.06, 379/265.11, 265.12, 265.13, 26, 226, 240
See application file for complete search history.

(56) References Cited

U.S. PATENT DOCUMENTS

| | | | | |
|---|---|---|---|---|
| 5,825,869 A * | 10/1998 | Brooks et al. | ......... | 379/265.12 |
| 5,870,464 A * | 2/1999 | Brewster et al. | ............ | 379/219 |
| 6,058,435 A * | 5/2000 | Sassin et al. | ................ | 719/331 |
| 6,128,380 A * | 10/2000 | Shaffer et al. | ......... | 379/265.01 |
| 6,185,292 B1 * | 2/2001 | Miloslavsky | ........... | 379/265.01 |
| 6,381,640 B1 * | 4/2002 | Beck et al. | ................... | 709/223 |
| 6,408,066 B1 * | 6/2002 | Andruska et al. | ...... | 379/265.12 |
| 6,424,709 B1 * | 7/2002 | Doyle et al. | ........... | 379/265.02 |
| 6,453,038 B1 * | 9/2002 | McFarlane et al. | .... | 379/265.05 |
| 6,539,538 B1 * | 3/2003 | Brewster et al. | ............ | 717/115 |
| 6,553,113 B1 * | 4/2003 | Dhir et al. | .............. | 379/265.02 |
| 6,563,788 B1 * | 5/2003 | Torba et al. | ................. | 370/229 |
| 6,584,192 B1 * | 6/2003 | Agusta | ................... | 379/265.12 |
| 6,587,556 B1 * | 7/2003 | Judkins et al. | ............... | 379/219 |
| 6,603,854 B1 * | 8/2003 | Judkins et al. | ......... | 379/265.06 |
| 6,697,858 B1 * | 2/2004 | Ezerzer et al. | .............. | 709/224 |
| 6,704,410 B1 * | 3/2004 | McFarlane et al. | .... | 379/265.05 |
| 6,707,904 B1 * | 3/2004 | Judkins et al. | ......... | 379/265.06 |
| 6,714,643 B1 * | 3/2004 | Gargeya et al. | ........ | 379/266.06 |
| 6,741,698 B1 * | 5/2004 | Jensen | ................... | 379/265.02 |

(Continued)

FOREIGN PATENT DOCUMENTS

EP 740450 A2 * 10/1996

(Continued)

OTHER PUBLICATIONS

Tanir et al. "Call center simulation in Bell Canada", Proceedings of the 31st conference on Winter simulation: Simulation—a bridge to the future—vol. 2, 1999, pp.: 1640-1647.*

(Continued)

*Primary Examiner*—David Wiley
*Assistant Examiner*—Yemane M. Gerezgiher
(74) *Attorney, Agent, or Firm*—Baker Botts L.L.P.

(57) ABSTRACT

A method which routes a communication session, from a client to a service agent station, utilizing a dynamic skills table improves the efficiency of the communication session and increases client satisfaction. A remote server dynamically updates the skills table with service agent information, obtained from one or more sources, and communicates the skills table to a switch. A profile of the client's request for the communication session is generated and compared to the skills table. The switch subsequently routes the client to the optimal service agent station.

18 Claims, 4 Drawing Sheets

U.S. PATENT DOCUMENTS

| | | | |
|---|---|---|---|
| 6,744,877 B1 * | 6/2004 | Edwards | 379/265.02 |
| 6,763,104 B1 * | 7/2004 | Judkins et al. | 379/265.09 |
| 6,813,636 B1 * | 11/2004 | Bean et al. | 709/226 |
| 6,853,721 B1 * | 2/2005 | Mengshoel et al. | 379/265.06 |
| 2002/0006191 A1 * | 1/2002 | Weiss | 379/265.01 |
| 2002/0159475 A1 * | 10/2002 | Hung et al. | 370/465 |
| 2003/0026414 A1 * | 2/2003 | Baker et al. | 379/265.13 |
| 2003/0059029 A1 * | 3/2003 | Mengshoel et al. | 379/265.02 |
| 2004/0005048 A1 * | 1/2004 | Agusta | 379/265.12 |

FOREIGN PATENT DOCUMENTS

| | | | |
|---|---|---|---|
| EP | 1039732 A2 | * | 9/2000 |
| EP | 1056264 A2 | * | 11/2000 |
| EP | 1111890 A2 | * | 6/2001 |

OTHER PUBLICATIONS

Bapat et al. "Using simulation in call centers", Proceedings of the 30th conference on Winter simulation, 1998.*

* cited by examiner

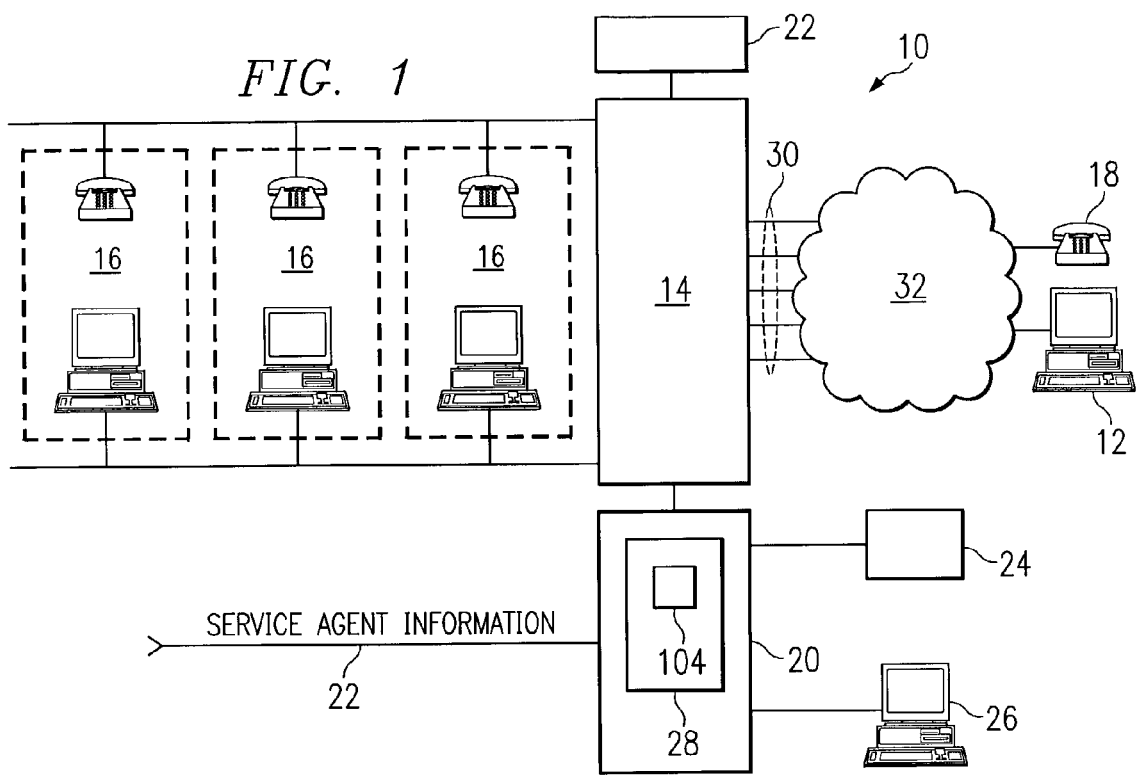
FIG. 1
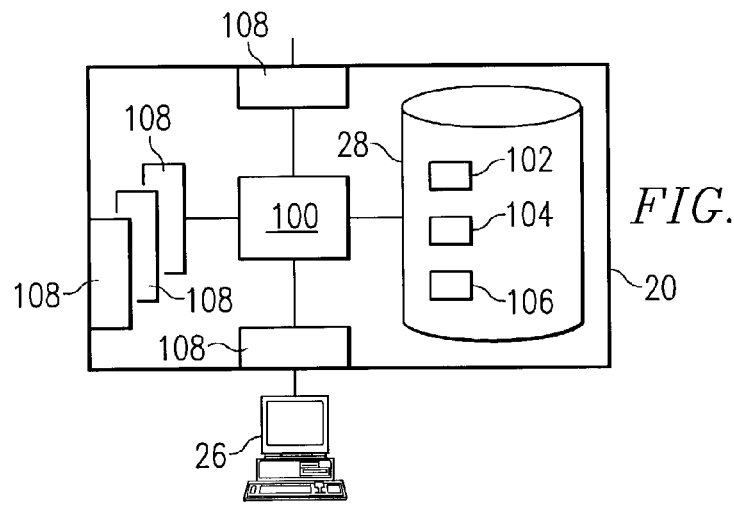
FIG. 3
FIG. 4
| AGENT ID | CLIENT SATISFACTION | FRENCH | AVERAGE LENGTH OF SESSION | AVAILABILITY | ○ ○ ○ | SKILL N |
|---|---|---|---|---|---|---|
| EILER | 8 | 8 | 7 | 9 | ○ ○ ○ | 10 |
| 2349 | 0 | 0 | 0 | 3 | ○ ○ ○ | 0 |
| nicole@etalk.com | 9 | 0 | 2 | 10 | ○ ○ ○ | 7 |
| 150.0.8.1 | 3 | 4 | 0 | 6 | ○ ○ ○ | 0 |

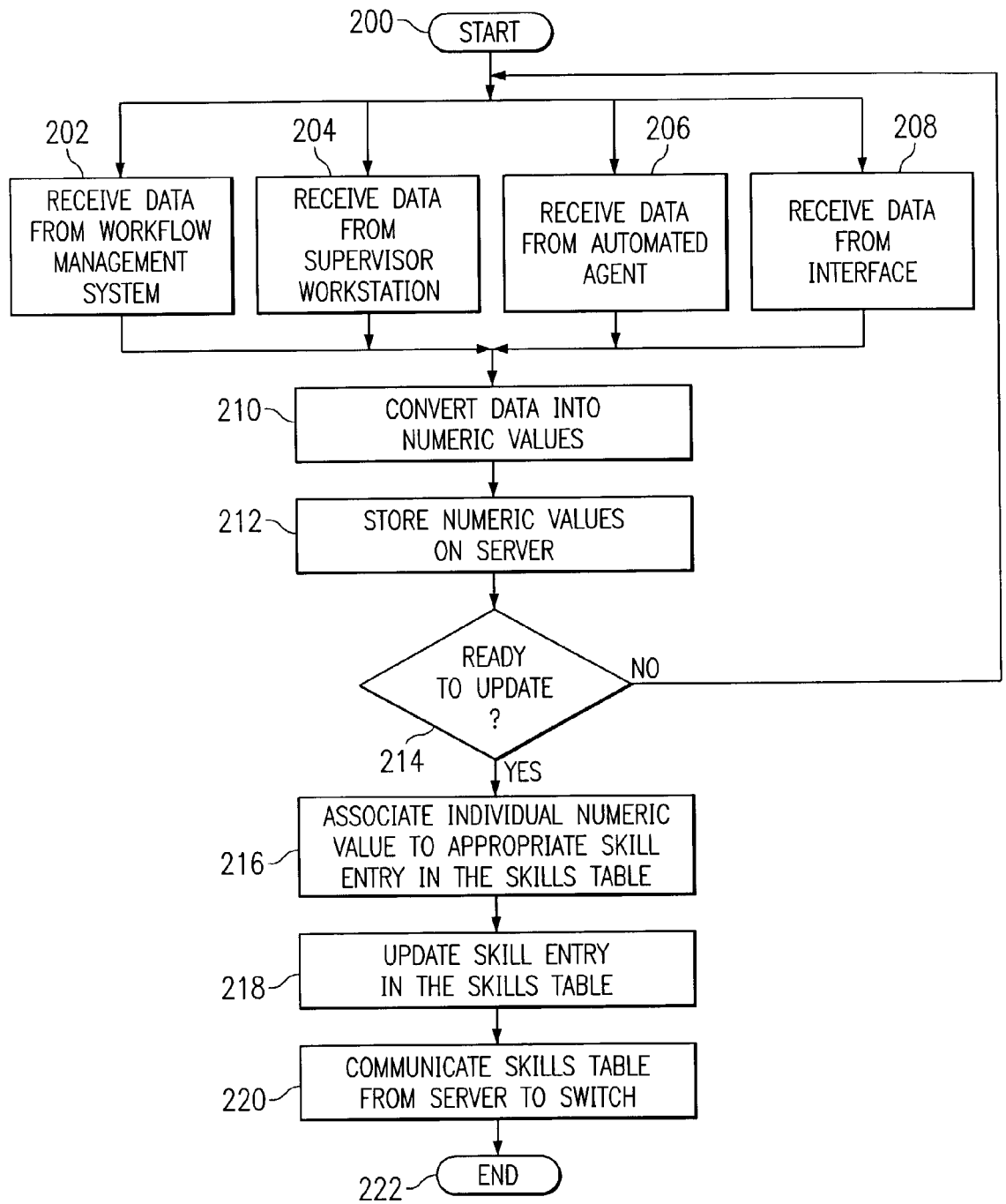

SKILLS-BASED ROUTING OF A COMMUNICATION SESSION

TECHNICAL FIELD OF THE INVENTION

The present invention relates generally to the field of telecommunication systems, and more particularly to skills-based routing of a communication session.

BACKGROUND OF THE INVENTION

In a traditional call center environment, when a client attempts to establish a communication session with a service agent station, a switch receives the initial communication and routes the call to the first available service agent station. This routing may be based on a single piece of client identifier data, such as a VRU response or the incoming trunk line. Occasionally, the switch contains a static service agent skills table. The switch then routes the communication session to a selected service agent station, where the service agent station is determined by the limited information the static table provides.

SUMMARY OF THE INVENTION

In accordance with the present invention, a method is provided for skills-based routing of a communication session received at a switch. In a particular embodiment, the present invention provides a method for skills-based routing of a communication session received at a switch, where a server generates a profile of the communication session and compares the profile to a skills table resulting in a selection of a service agent station.

According to one embodiment of the present invention, a method for skills-based routing of a communication session received at a switch includes: receiving a request to establish a communication session between a client and one of a plurality of service agent stations; generating a profile of the communication session in response to the request, wherein the profile of the communication session comprises at least two attributes; comparing the profile of the communication session to a skills table, wherein the skills table associates a service agent to a plurality of skill entries in a service agent record; and selecting one of the service agent stations in response to comparing the profile of the communication session to the skills table.

In accordance with another embodiment, the present invention provides a method for skills-based routing of a communication session received at a switch that includes associating each attribute of the profile to the corresponding skill entry in a skills table resulting in a subset of skill entries; prioritizing the subset of skill entries by applying one or more arithmetic algorithms; and generating an ordered list utilizing results of prioritizing the subset of skill entries, wherein the ordered list identifies one or more service agent records.

In accordance with yet another embodiment, the present invention provides a method for dynamically updating a skills table, the method comprising the following steps performed at a server remotely located from a switch: receiving service agent information; storing the service agent information on the server; updating a skills table utilizing the service agent information, wherein the skills table associates each service agent to a plurality of skill entries in a service agent record; and communicating the skills table to a switch remotely located from a server.

Technical advantages of certain embodiments of the present invention include providing a higher level of service to the client by connecting the client with the optimal available service agent station. In a particular embodiment, information is collected identifying the client's attempt to establish a communication session. The server subjects the client identifier information, in a particular embodiment, having two or more attributes, to mathematical manipulation and compares the results to two or more related skills in a dynamic service agent skills table. In this manner, the system generates an ordered list of the optimal service agent stations for the particular client. The ordered list results in a more efficacious communication session.

Further technical advantages include the dynamic update of the skills table utilizing service agent information collected at a server remotely located from the switch. The service agent information may be qualitative or quantitative data. The update can either be requested by the server or can be scheduled to run at selected times. In a particular embodiment, client identifier data may be received from a voice response unit and converted into numeric values. The information is then matched to two or more entries in the skills table and utilized to update the associated entry. All or part of the updated skills table may be communicated to the switch. Accordingly, the switch will route the client to the service agent station using up-to-date information from the skills table. Additionally, the present invention provides that the skills table requires little manual input or administration.

Other technical advantages of certain embodiments of the present invention include linking the generated ordered list to a workflow management system. In this manner, the unavailable service agent stations can be removed from the ordered list and the client does not remain in a queue longer than necessary. Other technical advantages of the present invention will be readily apparent to one skilled in the art from the following figures, descriptions and claims.

BRIEF DESCRIPTION OF THE DRAWINGS

For a more a complete understanding of the present invention and its advantages, reference is now made to the following descriptions, taken in conjunction with the accompanying drawings, in which:

FIG. 1 provides a conceptual illustration of a system for skills-based routing of a communication session in accordance with the present invention;

FIG. 3 provides a conceptual illustration of a remotely located server in the system;

FIG. 4 provides a conceptual illustration of a service agent skills table;

FIG. 6 is a flowchart of a method for dynamically updating the skills table with qualitative and quantitative data.

DETAILED DESCRIPTION OF THE INVENTION

Figure 2:
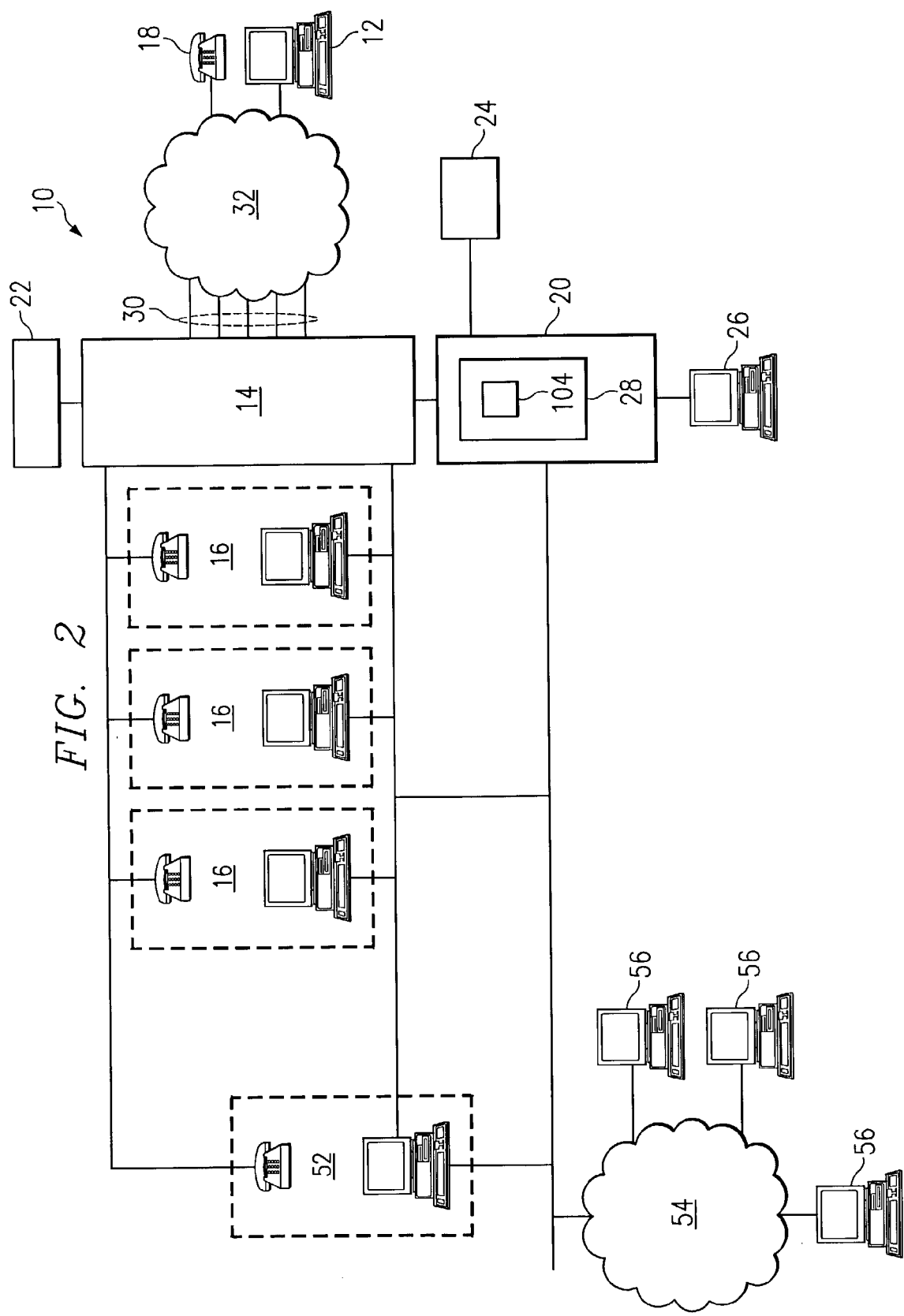
FIG. 2 provides a conceptual illustration of associated components for dynamically updating a service agent skills table with qualitative and quantitative data.

FIG. 1 provides an illustration of a system 10 for skills-based routing of a communication session received at a switch 14. System 10 may be a distributed environment linked through a network 32 such as the Internet, a local area network (LAN), a wide area network (WAN), or other wireless or wireline communication network. Generally, network 32 may include any combination or arrangement of components in software and/or hardware that perform packet-based, circuit switched, or other form of communicating information between a client 12 and a service agent station 16. In general, switch 14 directs sessions initiated by clients 12 to appropriate stations 16 using a profile of the session and a service agent skills table.

System 10 includes switch 14, which may be digital, analog, packet-based, circuit-switched, or other form of switching and/or communication capability in hardware and/or software. Switch 14 is capable of communicating to a public telephone system, a private line system or a network, that routes a communication session between client 12 and service agent station 16. Additionally, switch 14 may be a virtual switch in a distributed environment.

Client 12 may be a telephone, a computer, or any other instrument capable of communicating with system 10, possibly through a trunk line 30. Service agent station 16 is a workstation which may include a telephone, a computer, or any other device which may be used to conduct communications with system 10 and client 12. System 10 also contemplates service agent station 16 communicating from a remote location in a distributed environment. Switch 14 may also be linked to an automated agent 18, which includes a voice response unit (VRU) or other interactive device.

System 10 includes a server 20, which may include memory 28 storing a skills table 104. Memory 28 comprises random access memory (RAM), read-only memory (ROM), CD-ROM, removable or fixed magnetic or optical storage media, or any other suitable volatile or non-volatile memory. Skills table 104 is a data structure stored in memory 28 that is dynamically updated by service agent information 22. Additionally, system 10 includes an administrative workstation 26 linked to server 20 to allow for the proper administration of system 10. System 10 may also include a workflow management system 24 that measures the quantitative data concerning one or more communication sessions between client 12 and service agent station 16 and records the availability of service agent station 16.

In operation, switch 14 receives a request for a communication session from client 12, where client 12 is attempting to communicate with service agent station 16. Switch 14 then retrieves client identifier data. Passive client identifier data may include a line identifier identifying trunk line 30 on which the communication is received, the telephone number of client 12, the IP address of client 12, or any other data which may be used to identify the session and/or client 12 and is capable of being retrieved without additional action by client 12. Additionally, active client identifier data may be retrieved through, for example, the use of automated agent 18.

System 10 communicates the client identifier data to server 20 remotely located from switch 14. Server 20 compiles the available client identifier data, whether active or passive, and uses the data to generate a profile of the communication session. The profile includes a number of attributes identifying client 12 and the needs of client 12. If necessary, server 20 converts the attributes of the profile into numeric values. Server 20 uses one or more algorithms to apply arithmetic calculations to the attributes. Next, server 20 compares each attribute to the corresponding skill in skills table 104. Server 20 subjects the results of the comparison to computations which prioritize the various skills entries extracted from skills table 104.

Once the comparison of skills table 104 and the profile is complete, server 20 selects one service agent station 16 utilizing the prioritized results. System 10 associates each service agent record with one service agent station 16. An ordered list may include all or a subset of service agent records. In one embodiment, the ordered list of service agent records is linked to workflow management system 24 to determine the availability of the preferred service agent station 16. For example, if the preferred service agent station 16 may be unavailable, server 20 removes the service agent record from the ordered list in order to reduce the queue time of client 12. The next service agent station 16 in the ordered list is then evaluated for availability. In another embodiment, all of the unavailable service agent stations 16 are first removed from the ordered list, then the preferred service agent station 16 is selected from the remaining service agent records.

FIG. 2 provides a conceptual illustration of associated components for dynamically updating a service agent skills table 104 with service agent information 22. Supervisor workstation 52 is coupled to system 10 and may include a computer, a telephone, or other components used to link to system 10 and can be onsite or remote. System 10 also allows for a client 56 to connect through a network-based interface 54. Client 56 may be a telephone, a computer, or any other instrument capable of communicating with system 10. Interface 54 may be through the Internet, a local area network (LAN), a wide area network (WAN), or other wireless or wireline communication network.

In operation, system 10 compiles raw service agent information in order to dynamically update skills table 104. Once compiled, the server converts the raw service agent information to numeric values. After server 20 obtains the numeric values, server 20 dynamically updates skills table 104 stored in memory 28. The updating of skills table 104 can occur on an as-needed basis, on request, or at predetermined intervals. Additionally, a user of administrative workstation 26 can manipulate the data at any step whether the data is the raw data, the numeric values, and/or data located in skills table 104. The server then communicates the updated skills table 104 to switch 14. Server 20 can communicate skills table 104 to switch 14 either whole or in part.

One embodiment of system 10 compiles service agent information 22 through the use of automated agent 18. Once the communication session between client 12 and service agent station 16 is complete, switch 14 routes client 12 back to automated agent 18 where, for example, a survey may be conducted. Automated agent 18 queries client 12 concerning the performance of service agent station 16. Automated agent 18 collects the responses from client 12 and communicates the responses to server 20, where the responses may be subjected to numeric manipulation. Server 20 uses the resulting numeric values to dynamically update skills table 104.

Another embodiment of system 10 compiles service agent information 22 through the use of a supervisor located at supervisor workstation 52. The supervisor monitors, either delayed or in real-time, the communication session between client 12 and service agent station 16. For example, the supervisor records a particular communication session, have the communication session transcribed, and read a copy of the communication session on his workstation. In another example, the supervisor utilizes his telephone and monitors the communication session as the session occurs.

After the monitoring, the supervisor rates the service agent located at service agent station 16 on one or more skills. These skills may include, for example, language proficiency, knowledge of the subject matter of the communication session, length of the communication session, politeness of the service agent station 16, or overall client satisfaction. The supervisor then communicates raw data 102 to system 10 in order for raw data 102 to be converted into numeric values. In one example, the supervisor uses a networked application to provide feedback on a service agent.

System 10 may also include the use of workflow management system 24 to compile quantitative data. This quantitative data may include, for example, the number of communication sessions handled by service agent station 16 in a set amount of time. Workflow management system 24 may also generate data concerning items such as the average length of a communication session, the number of work breaks taken by service agent station 16, or the number of vacation or sick days taken by service agent station 16. Workflow management system 24 communicates the data to server 20.

System 10 may also utilize network-based interface 54. Interface 54 allows a remote or local client 56 to connect to system 10 and provide service agent information. Interface 54 queries client 56 on a recent communication session between client 56 and service agent station 16. Interface 54 retrieves the answers given by client 56. Interface 54 then communicates the answers to server 20. If necessary, server 20 converts the answers into numeric values for use in updating skills table 104. The information retrieved from client 56 may include data pertaining to overall client satisfaction, whether the communication session resulted in a successful conclusion, or any number of other data elements which may be capable of being measured qualitatively.

Once the raw data is gathered and converted into numeric values, server 20 uses the numeric values to dynamically update skills table 104 stored in memory 28. Server 20 then communicates updated skills table 104 to switch 14. This update can occur at predetermined times or upon request and may comprise of all or a subset of the skills table 104.

FIG. 3 illustrates an exemplary structure of server 20 remotely located from switch 14. Server 20 includes a processor 100, memory 28 and a number of interfaces 108. Interfaces 108 may include links to switch 14, network 54, supervisor workstation 52, the Internet, phone lines or any other component capable of transmitting data to or receiving data from server 20. In normal operation, each interface 108 is capable of both receiving and transmitting data.

For purposes of system 10, memory 28 may include a number of data structures including a raw data structure 102, skills table 104, and administrative data structure 106. Raw data 102 may include service agent information or client identifier data or any data to be manipulated by server 20. Administrative data 106 may include information such as data upload times, processing downtimes, or other data used to manage server 20 and distributed system 10.

Much of the data is retrieved by interfaces 108. One interface 108 links server 20 to administrative workstation 26. This interface 108 allows the user of administrative workstation 26 to manipulate the data contained in memory 28 on server 20.

In operation, server 20 receives service agent information 22 through interface 108. Processor 100 converts service agent information 22 into numeric values and stores the results in memory 28 in raw data structure 102. Next, processor 100 may utilize information stored in the administrative data structure 106 to determine the next update time for skills table 104. At the appropriate time, processor 100 utilizes the data from raw data structure 102 to update skills table 104.

Server 20 also generates an ordered list of service agent stations 16 using skills table 104. First, server 20 receives a request for service agent station 16 from switch 14 through interface 108. Processor 100 collects client identifier data from system 10 and stores the data in memory 28 in raw data structure 102. Next, processor 100 generates a communication session profile, including a number of attributes, and subjects the profile to mathematical algorithms. Next, processor 100 compares the communication session profile with skills table 104 and prioritizes the results. Processor 100 then generates an ordered list based on the prioritized results. Processor 100 may remove unavailable service agent stations 16 using data received from workflow management system 24 through interface 108. Server 20 then selects one service agent station 16 from the ordered list and communicates the selection to switch 14 using interface 108.

FIG. 4 illustrates skills table 104 that stores the performance of a service agent in a variety of skill categories. Skills table 104 is dynamic and may be stored in memory 28. Additionally, skills table 104 is a multi-dimensional data structure which includes at least one agent record 122. Each agent record 122 includes one service agent identifier 120 and a plurality of skill entries 126, each skill entry representing a skill category. Service agent identifier 124 may be represented, for example, by the last name of the service agent, the employee number of the service agent, an email address of the service agent, an IP address of service agent station 16, or any other method of uniquely identifying the service agent. Skill entry 126 is a value representing the service agent's performance in a particular skill category. System 10 associates each service agent record with one service agent station 16.

In operation to dynamically updated skills table 104, server 20 compiles raw service agent information and stores the raw service agent information in memory 28. Next, server 20 associates at least one raw numeric value to at least one skill entry 126 in skills table 104. Once a raw numeric value is associated with skill entry 126, server 20 updates the entry using one or more mathematical calculations, including averaging or replacing the prior value with the new raw numeric value.

The example skills categories shown in skills table 104 are client satisfaction, French, average length of session, and availability. Skills categories illustrated in skills table 104 are merely exemplary. System 10 contemplates any other suitable category to assess the performance of the service agent. Moreover, each category may represent one or more calculations, variables, manipulations, or other processing to arrive at a meaningful, numeric measure of performance.

As an example, the "French" category measures and evaluates the service agent's proficiency in the language. The "average length of session" category could measure, for example, the average number of minutes or a supervisor rating of the average length of a communication session. The "availability" category measures the number of personal breaks taken by the service agent, the number of vacation or sick days, the number of hours worked, or any other measure of the service agent's workload. The "client satisfaction" category assesses whether there is a successful outcome to the communications session, how happy the user of client 12 was with the service agent's performance, or any other objective and/or subjective information about the service agent from the perspective of the user of client 12.

Figure 5:
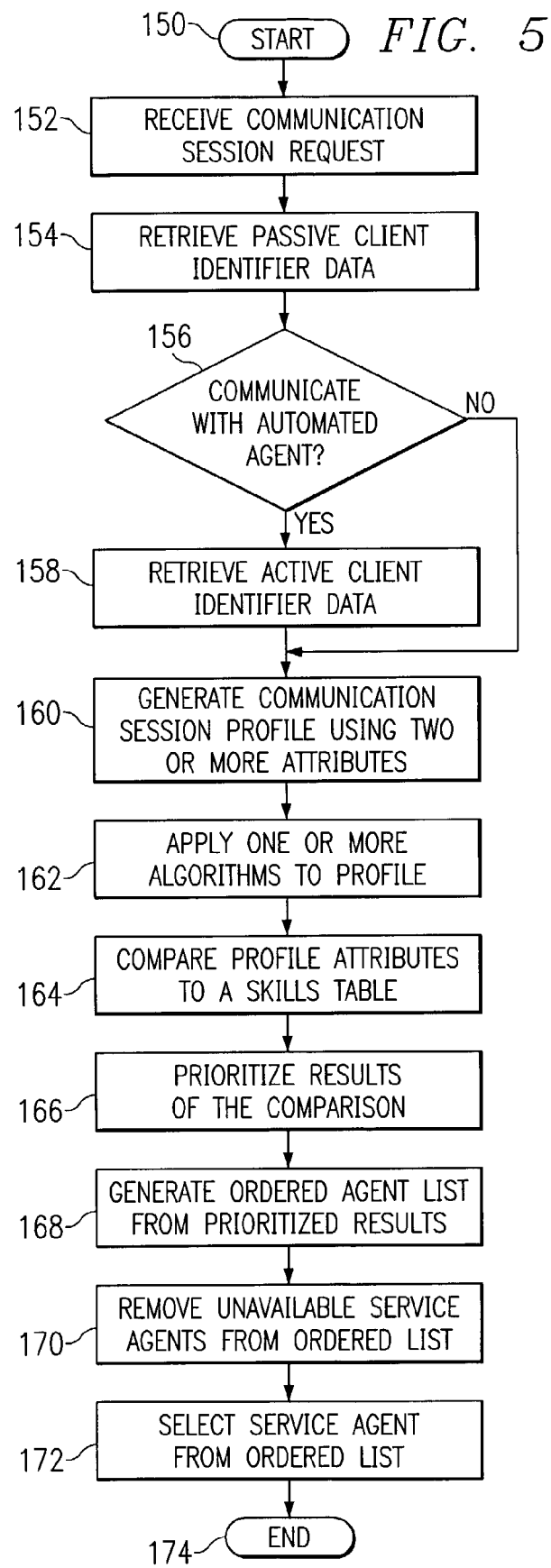
FIG. 5 is a flowchart of a method for routing a communication session received at a switch utilizing a dynamic service agent skills table.

FIG. 5 illustrates a flowchart of a method for routing a communication session received at a switch utilizing a dynamic service agent skills table. The method begins at step 150. The switch, at step 152, receives a communication request from a client. The passive client identifier data is retrieved at step 154.

A decision is made whether the client communication is routed through an automated agent at step 156. If the client did not communicate with an automated agent, then step 160 is next. Otherwise, step 158 is next. At step 158, the active client identifier data is retrieved utilizing the automated agent. The method then proceeds to step 160.

At step 160, a communication session profile is generated using two or more attributes of the client identifier data. One or more algorithms are applied to the communication session profile at step 162. The attributes of the modified profile are compared to the appropriate entries in the service agent skill table at step 164. The results of the comparison are prioritized utilizing additional algorithms at step 166.

At step 168, the prioritized results are used to generate an ordered list of service agent records. The unavailable service agents are removed from the ordered list of service agent records at step 170. The optimal service agent record is selected from the ordered list at step 172, and the process ends at step 174.

FIG. 6 illustrates a flowchart demonstrating the procedure for dynamically updating skills table. As illustrated in FIG. 6, the process begins at step 200. The first step is to receive the raw service agent information. The server may receive the data from a workflow management system, at step 202, from a supervisor workstation, at step 204, from an automated agent, at step 206, and/or from an interface, at step 208. These four steps can occur separately or concurrently. Once data has been received, the server converts the data into numeric values at step 210. The numeric values are stored on the server at step 212.

A decision is made at step 214 whether the server should begin the update process. If not, steps 202 through 214 are repeated until the appropriate update time is reached. Otherwise, at step 216, the server associates an individual numeric value to the appropriate skill entry. This entry is located within one service agent record in the skills table. The server updates the associated skill entry in the skills table at step 218. The updated skills table is communicated from the server to the switch at step 220 and the method ends at step 222.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for skills-based routing of a communication session received at a switch, comprising:
   receiving, at a switch, a request to establish a communication session between a client and one of a plurality of service agent stations;
   generating a profile of the communication session in response to the request, wherein the profile of the communication session comprises at least two attributes;
   comparing the profile of the communication session to a skills table, wherein the skills table includes a plurality of service agent records, each service agent record associating a service agent station with one or more skill entries;
   identifying, based on the comparison of the profile and the skills table, a subset of the service agent records included in the skills table, wherein the subset contains a plurality of service agent records;
   generating an ordered list of service agent records by applying one or more arithmetic algorithms to skill entries associated with the subset of service agent records;
   selecting a service agent station associated with a first service agent record in the ordered list;
   receiving, at a server remote from the switch, service agent information from a client, the service agent information pertaining to a service agent station associated with the client;
   storing the service agent information on the server;
   dynamically updating a skills table utilizing the service agent information, wherein the skills table associates each service agent station with a plurality of skill entries in a service agent record; and
   communicating the skills table to the switch.

2. The method of claim 1, wherein generating a profile of a communication session comprises:
   establishing communication between the client and a voice response unit;
   receiving responses from the client;
   communicating the responses to a remotely located server; and
   generating the profile of the communication session utilizing the responses.

3. The method of claim 1, wherein comparing the profile of the communication session to a skills table comprises:
   applying one or more arithmetic algorithms to a plurality of attributes included in the profile to generate a plurality of modified attributes; and
   comparing the modified attributes to the skills table.

4. The method of claim 3, wherein selecting the service agent station comprises:
   assessing whether the service agent station associated with the first service agent record is available;
   selecting the service agent station associated with the first service agent record if the service agent station associated with the first service agent record is available; and
   selecting a service agent associated with a second service agent record in the ordered list if the service agent station associated with the first service agent record is unavailable.

5. The method of claim 1, wherein the method further comprises establishing a communication session between the client and the selected service agent station.

6. The method of claim 1, wherein receiving the service agent information comprises:
   establishing communication between the client and a voice response unit;
   requesting, through operation of the voice response system, service agent information pertain to a service agent station associated with the client;
   receiving data from the client at the server, wherein the data comprises at least one response to the request; and
   converting the data into numeric values.

7. The method of claim 1, wherein receiving the service agent information comprises:

establishing communication between the client and a network-based feedback system;
requesting, through operation of the network-based feedback system, service agent information pertaining to a service agent station associated with the client;
receiving data from the network-based system in response to the request; and
converting the data into numeric values.

8. The method of claim 1, wherein dynamically updating a skills table comprises:
associating the service agent information to the appropriate service agent record in the skills table; and
updating at least one service agent record associated with the service agent information.

9. The method of claim 1, wherein service agent information comprises information received from a supervisor workstation.

10. The method of claim 1, wherein communicating the skills table to a switch is in response to a request from the switch.

11. The method of claim 1, wherein communicating the skills table to the switch comprises communicating a subset of the skills table from the server to the switch.

12. The method of claim 1, wherein the switch comprises an automatic call distributor.

13. Software for skills-based routing of a communication session received at a switch, the software being embodied in a computer-readable medium and when executed by one or more computers operable to:
receive, at a switch, a request to establish a communication session between a client and a service agent station;
generate a profile of the communication session in response to the request, wherein the profile of the communication session comprises at least two attributes;
compare the profile of the communication session to a skills table, wherein the skills table includes a plurality of service agent records, each service agent record associating one of a service agent station with one or more skill entries;
identify, based on the comparison of the profile and the skills table, a subset of the service agent records included in the skills table, wherein the subset contains a plurality of service agent records;
generate an ordered list of service agent records by applying one or more arithmetic algorithms to skill entries associated with the subset of service agent records;
select a service agent station associated with a first service agent record in the ordered list;
receiving, at a server remote from the switch, service agent information from a client, the service agent information pertaining to a service agent station associated with the client;
storing the service agent information on the server;
dynamically updating a skills table utilizing the service agent information, wherein the skills table associates each service agent station with a plurality of skill entries in a service agent record; and
communicating the skills table to the switch.

14. The software of claim 13, wherein comparing the profile of the communication session to a skills table comprises:

applying one or more arithmetic algorithms to a plurality of attributes included in the profile to generate a plurality of modified attributes; and
comparing the modified attributes to the skills table.

15. The software of claim 13, wherein updating a skills table comprises:
associating the service agent information to the appropriate service agent record in the skills table; and
updating at least one service agent record associated with the service agent information.

16. A server, comprising:
an interface operable to communicate with a network, the interface further operable to;
receive a request to establish a communication session between a client and one of a plurality of service agent stations;
receive service agent information from a client, the service agent information pertaining to a service agent station associated with the client; and
after a skills table has been updated, communicate the updated skills table to a switch, wherein the skills table associates each service agent station to a plurality of skill entries in a service agent record;
a processing module coupled to the interface, the processing module operable to:
generate a profile of the communication session in response to the request, wherein the profile of the communication session comprises at least two attributes;
compare the profile of the communication session to a skills table, wherein the skills table includes a plurality of service agent records, each service agent record associating a service agent with one or more skill entries;
identify, based on the comparison of the profile and the skills table, a subset of the service agent records included in the skills table, wherein the subset contains a plurality of service agent records;
generate an ordered list of service agent records by applying one or more arithmetic algorithms to skill entries associated with the subset of service agent records;
select a service agent station associated with a first service agent record in the ordered list; and
dynamically update the skills table utilizing the servile agent information; and
a storage medium coupled to the processing module, the storage medium operable to store the skills table.

17. The sever of claim 16, wherein operable to update the skills table comprises:
operable to associate the service agent information to the appropriate service agent record in the skills table; and
further operable to update at least one service agent record associated with the service agent information.

18. The server of claim 17, wherein the processing module is operable to compare the profile of the communication session to a skills table by:
applying one or more arithmetic algorithms to a plurality of attributes included in the profile to generate a plurality of modified attributes; and
comparing the modified attributes to the skills table.

* * * * *